United States Patent [19]

Yang

[11] Patent Number: 5,269,197

[45] Date of Patent: Dec. 14, 1993

[54] PRINCIPLE AND STRUCTURE OF ACTIVELY DRIVING OR CENTRIFUGAL LINEAR FOLLOWING DYNAMIC FLYWHEEL EFFECT

[76] Inventor: Tai-Her Yang, 5-1 Taipin St., Si-Hu Town, Dzan-Hwa, Taiwan, Taiwan

[21] Appl. No.: 862,809

[22] Filed: Apr. 3, 1992

[30] Foreign Application Priority Data

Apr. 9, 1991 [GB] United Kingdom ............... 9107451

[51] Int. Cl.$^5$ .............................................. G05G 1/00
[52] U.S. Cl. .................................... 74/572; 74/573 R; 74/574
[58] Field of Search ................. 74/572, 573 R, 573 F, 74/574, 603, 604

[56] References Cited

U.S. PATENT DOCUMENTS

| | | | |
|---|---|---|---|
| 4,069,669 | 1/1978 | Pitkanen | 74/572 X |
| 4,116,088 | 9/1978 | Giovachini et al. | 74/572 |
| 4,128,020 | 12/1978 | Gray | 74/572 |
| 4,176,563 | 12/1979 | Younger | 74/572 |
| 4,643,035 | 2/1987 | Murphy | 74/572 X |
| 4,730,154 | 3/1988 | Pinson | 74/572 |
| 4,735,382 | 4/1988 | Pinson | 74/572 X |
| 4,788,883 | 12/1988 | Hashizume | 74/604 X |

FOREIGN PATENT DOCUMENTS

| | | | |
|---|---|---|---|
| 55-69349 | 5/1980 | Japan | 74/572 |
| 60-184745 | 9/1985 | Japan | 74/572 |
| 60-222634 | 11/1985 | Japan | 74/572 |
| 61-286636 | 12/1986 | Japan | 74/572 |
| 1020670 | 5/1983 | U.S.S.R. | 74/572 |

Primary Examiner—Vinh T. Luong
Attorney, Agent, or Firm—Leonard Bloom

[57] ABSTRACT

A device for storage and release of energy having a body rotatably connected to a center shaft and two fins pivotably connected to the body. The pins have arms which each have an inertia block on an end of the respective arm. The arms are connected to the body by springs. A hood connected to the center shaft deflects an air stream toward the fins and the fins are pivoted rearwardly, radially displacing the inertia arms by centrifugal force. When the force of the air stream decreases, the springs urge the inertia blocks to return and stored energy is released, sustaining the rotation of the body.

3 Claims, 5 Drawing Sheets

PRINCIPLE AND STRUCTURE OF ACTIVELY DRIVING OR CENTRIFUGAL LINEAR FOLLOWING DYNAMIC FLYWHEEL EFFECT

SUMMARY OF THE INVENTION

The conventional flywheel is often used for (1) energy storage (2) pulse absorption, and its inertial energy structure is at a solid state so that its energy absorption and release always appears speed increase during continuing energy storage and appears speed decreases during energy release. The present invention relates to provide a principle and structure of actively driving or centrifugal linear following dynamic flywheel effect to make fixed relationship between said energy storage, energy release and speed controllable and adjustable; when flywheel is used speed rate change can be minimized due to moment change, and due to dynamic energy is direct proportion to the square number of inertia mass times speed, where if flywheel speed is defined as 2−Rn then dynamic energy stored in the flywheel is:

$$E = \tfrac{1}{2} gc \times m(2-Rn)^2 = 2^{-2}/gc \times mR^2n^2$$

where,
E: energy, ft lbf or J
m: flywheel mass, lbm or kg
gc: converting factor = 32.2 lbm ft/(lbf S$^2$) = 1.0 kg/(N S$^2$)
R: gyration radius, ft or m
n: rotation per second (r/min)/60

DETAILED DESCRIPTION OF THE INVENTION

Among motive mechanisms, flywheel is an extremely important device, except made in wheel type, which may include other geometrical shapes such as star and polygon, etc. for fitting a variety of purposes, and the capacity of energy storage for flywheel is determined subject to inertia mass speed, and due to said effect it is widely applied to steady operation so as to reduce root motion and energy storage. However, all conventional flywheels comprise a fixed structure so that its inertia mass is permanent, and as far as a free flywheel is concerned, dynamic energy absorption would make rotational speed increasing and energy release would reduce its rotational speed. The principle and structure of actively driving or centrifugal linear following dynamic flywheel effect according to the present invention is to breakthrough the characteristics of fixed inertia mass of said conventional flywheels, and to mount at least two sets of inertia bodies radially along the center of flywheel, and apply active driving by fluid or mechanical power externally controlled to change its inertia mass and rotational speed by driving the distance between inertia block with the center, and besides the displacing block can be mounted with spring or compressive fluid which can store energy when inertia block is displacing/sliding radially so that when energy storage is increasing in speed, with centrifugal force which makes said radially displacing inertia block displacing outward radially to increase inertia mass, and when energy is released, inertia block is pushed back toward the center to reduce inertia block is pushed back toward the center to reduce inertia mass due to speed reduction and further reducing the change in its speed against energy storage or release.

Figure 1:
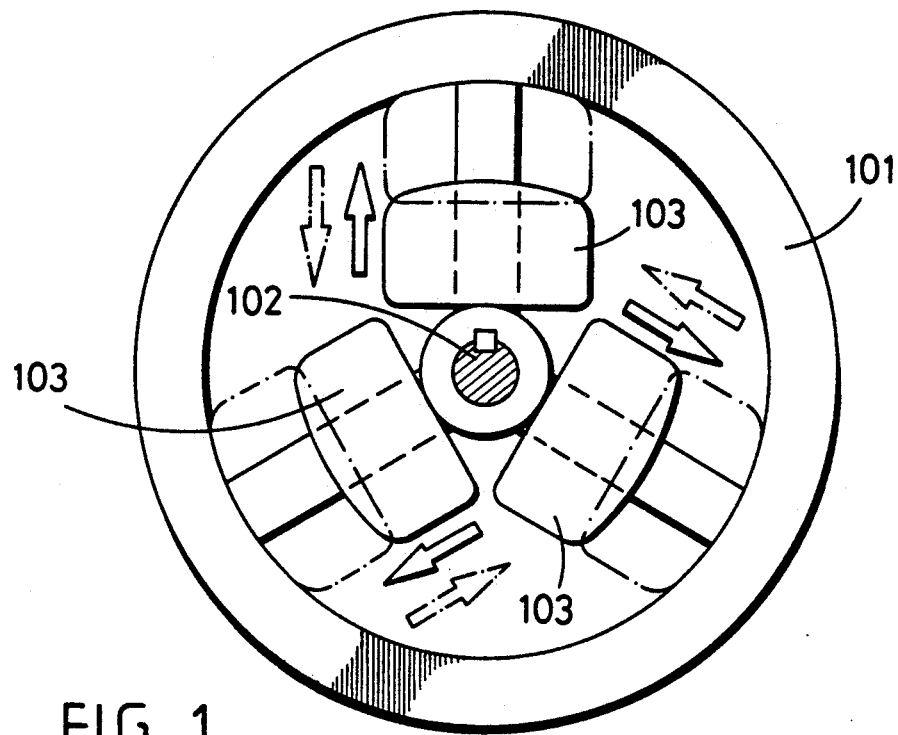
FIG. 1 is a diagram showing the principle and structure of actively driving or centrifugal linear following dynamic flywheel effect.

The basic principle of the present invention is described below:

FIG. 1 is a diagram showing the principle and structure of actively driving or centrifugal linear following dynamic flywheel effect, comprising:

flywheel 101: for accepting energy storage speed up or steady operation or energy release speed down, to be round shape or other geometrical shapes meeting the requirement of mechanism;

flywheel gyration center 102: provided as mechanism center for flywheel gyration;

inertia block 103: radially mounted at the flywheel and permitted to displace radially in radiant manner for adjusting and driving so as to change the value of inertia mass of flywheel;

with above-said basic structure we can obtain a flywheel with convertible inertia mass.

The principle, structure and basic structural shape of actively driving or centrifugal linear following dynamic flywheel effect according to the present invention includes: (A) inertia block is driven by fluid or mechanical power for radially radiant adjusting, the functions including:

1. when flywheel energy storage speed up, to drive/adjust inertia block for increasing or decreasing its inertia mass to change its speed variation rate;

2. when flywheel in inertia operation, to drive/adjust interia block for increasing or decreasing its inertia mass so as to change its inertia operational speed;

3. when flywheel releases energy to speed down, to drive/adjust inertia block for increasing or decreasing its inertia mass so as to change its speed variation rate.

4. The driving source for driving and adjusting the inertia block may further recover its centrifugal dynamic force during the inertia block displaces outwardly, and related recover means include mechanical type energy storage, or conversion into heat or electricity or chemical energy for recovery.

Figure 2:
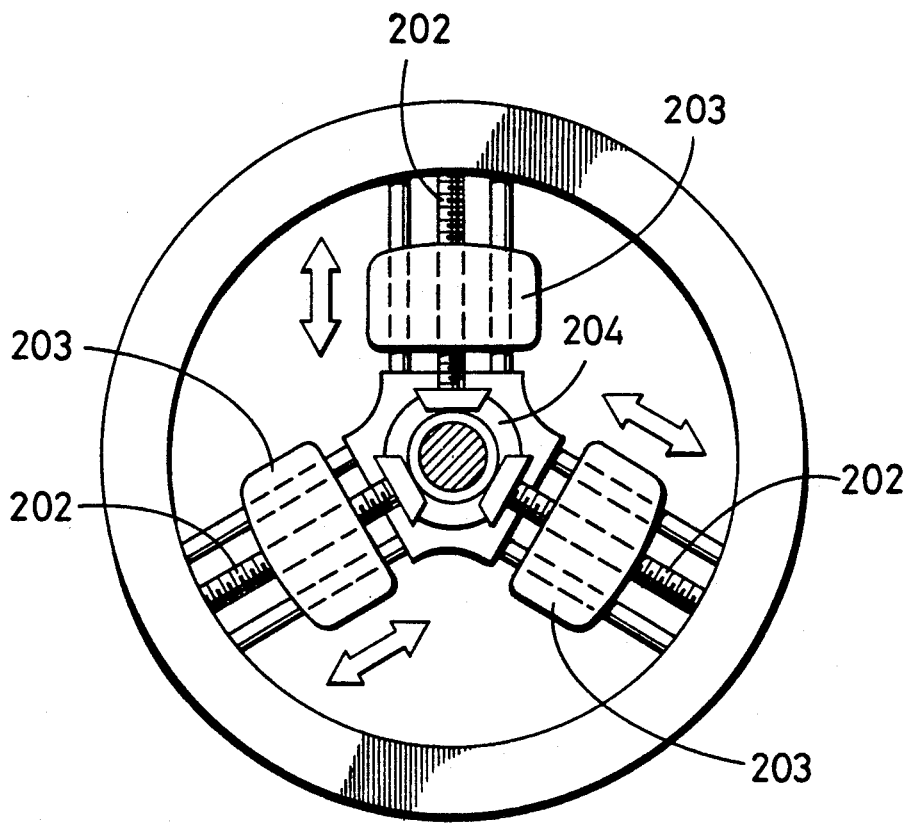
FIG. 2 is a diagram showing the embodiment of worm active driving to adjust inertia block to change its inertia mass.

FIG. 2 is a diagram showing the embodiment of worm active driving to adjust inertia block to change its inertia mass comprising:

inertia block 203: mounted at radially radiant-type guide way on the flywheel and permitted to displace along said guide way;

driving worm 202: for coupling with inertia block and for driving inertia block to displace and adjust, the worm having umbrella gear for jointly accepting externally connected driving for synchronous adjustment;

flywheel 201: with at least two sets of radially radiant-type guide ways provided to accommodate inertia block for radially radiant-shape driving therealong;

driving umbrella gear 204: for accepting manpower or mechanical power drive and further driving each coupling gear set for driving worm.

Figure 3:
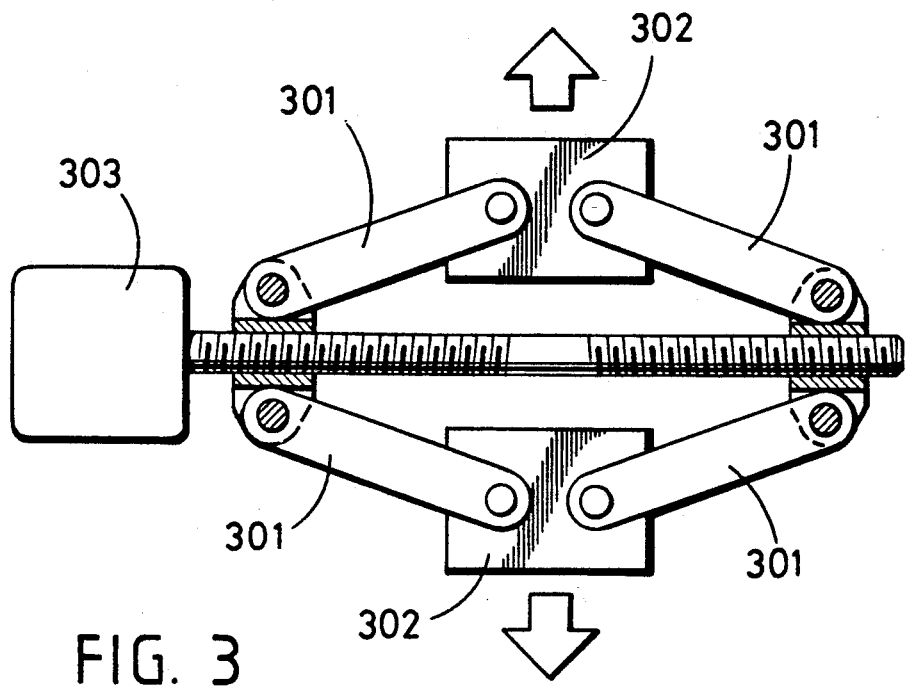
FIG. 3 is a diagram showing the embodiment of shear type link forming active drive to adjust flywheel inertia mass.

FIG. 3 is a diagram showing the embodiment of shear type link forming active drive to adjust flywheel inertia mass, its function is same as FIG. 2, comprising:

flywheel main body: comprising at least two pairs of shear type structures to drive folding support arm 301, and radially and outward abrupted joint is mounted with inertia block 302 for increasing flywheel effect;

shear type structure contacted angle adjustment device 303: the outward abrupted contacted angle adjustment of above-said shear type structure may change the radius of inertia block and axial and further to change inertia mass of flywheel, we can apply drive of linear driving device such as worm or fluid or solenoid, etc. to change contacted angle of radially outward abrupted joint of folding support arm.

Figure 4:
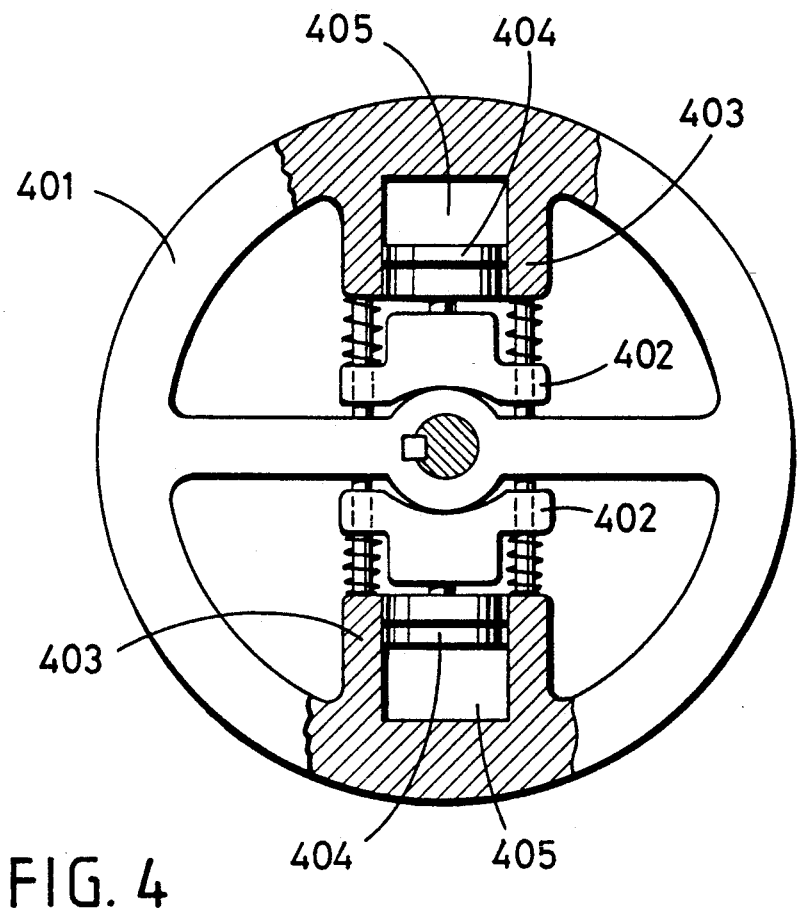
FIG. 4 is a diagram showing the embodiment of pneumatic cylinder and piston to form centrifugal linear following for changing inertia mass.

The above-said inertia block driving worm as shown in FIGS. 2 and 3 wherein the embodiments of inertia driven by mechanical power is only for explanation purpose, and based on the present invention we can use motor or other kind of mechanical device for driving inertia block or in substitute by fluid linear driving device comprising fluid cylinder, piston and link and use rotary fluid connector for leading in pressure fluid and use tube for guiding into said fluid linear driving device to drive/adjust inertia block. (B) elastic mechanism or compressive fluid device which can store energy when inertia block energy storage speed up to proceed in radially centrifugal displacement, and recover inertia for displacement when energy release for speed down to offer centrifugal linear following dynamic function, the embodiment of such functional structure is described below:

FIG. 4 is a diagram showing the embodiment of pneumatic cylinder and piston to form centrifugal linear following for changing inertia mass, comprising:

inertia block 402: mounted at flywheel 401 and relatively driven by radially and radiant-type mounted air cylinder 403 and piston 404, and forming pressure storage chamber 405 between cylinder body and piston by means of centrifugal force externally displacement, when centrifugal force is reduced such pressure storage chamber is to push inertia block to return to axial for changing inertia mass of flywheel with pressure.

Figure 5:
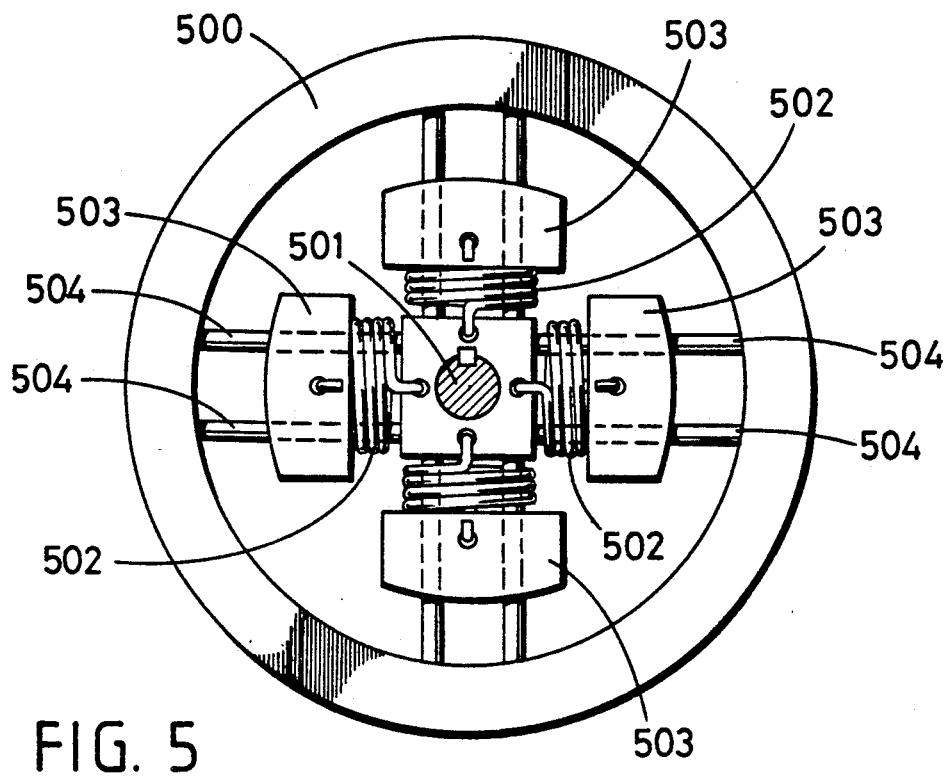
FIG. 5 is an embodiment of centrigual linear following structure comprising radially mounted tension spring in company with inertia block.

FIG. 5 is an embodiment of centrigual linear following structure comprising radially mounted tension spring in company with inertia block, comprising:

flywheel 500: for energy storage and release rotary driving and for mounting inertia block and positioning spring, etc. thereon; flywheel axial 501: as gyration center for flywheel;

at least two sets of inertia block tension positioning spring 502: one end secured near the internal rim of flywheel and stretching outward, and end portion externally stretching also connected to inertia block;

inertia block 503: for mounting inertia block positioning spring outward stretching end, when rotational speed of flywheel is faster, centrifugal force is increased to overcome spring force for radially displacement and when the rotational speed of flywheel is decreased gradually, it tends to return to the center to make flywheel inertia mass accompanying speed variation;

tension spring and inertia block sliding guiding rod structure 504: being made into guide rod type or hole groove shape.

Above-said radially radiant-type tension spring is provided to match inertia block to form centrifugal linear following and tension spring also can be changed into tension spring and inertia block can be mounted near the side of axial instead, and spring can be mounted at external side instead.

Figure 6:
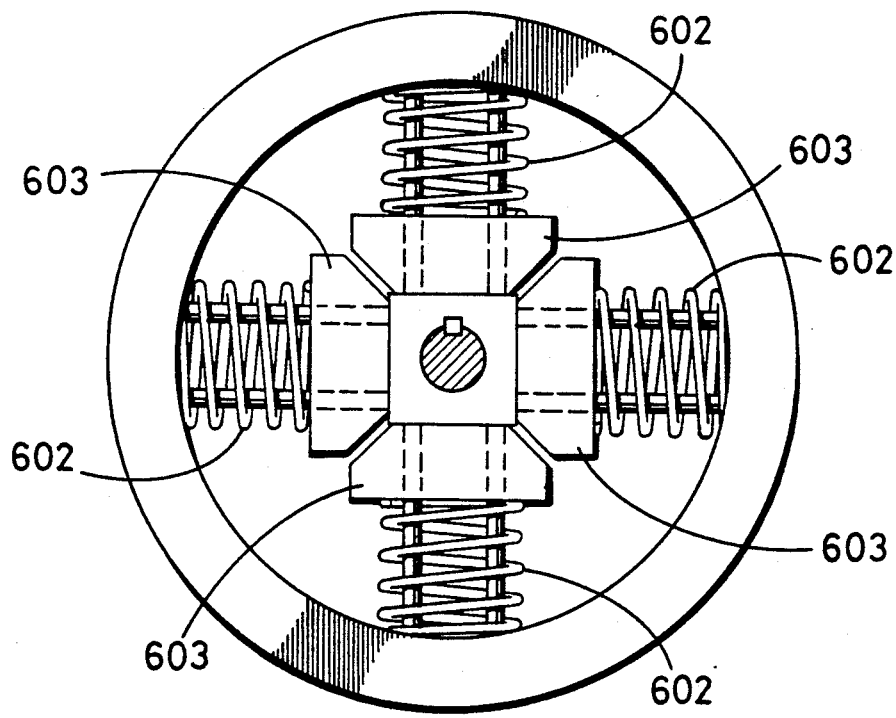
FIG. 6 is an embodiment of the structure of radially mounted tension spring.

FIG. 6 is an embodiment of the structure of radially mounted tension spring wherein:

spring 602: appearing radiant-type radially mounted at external side of flywheel;

inertia block 603: appearing radiant-type radially displacement and mounted near the axial and for accepting tension pre-pressure of spring.

Figure 7:
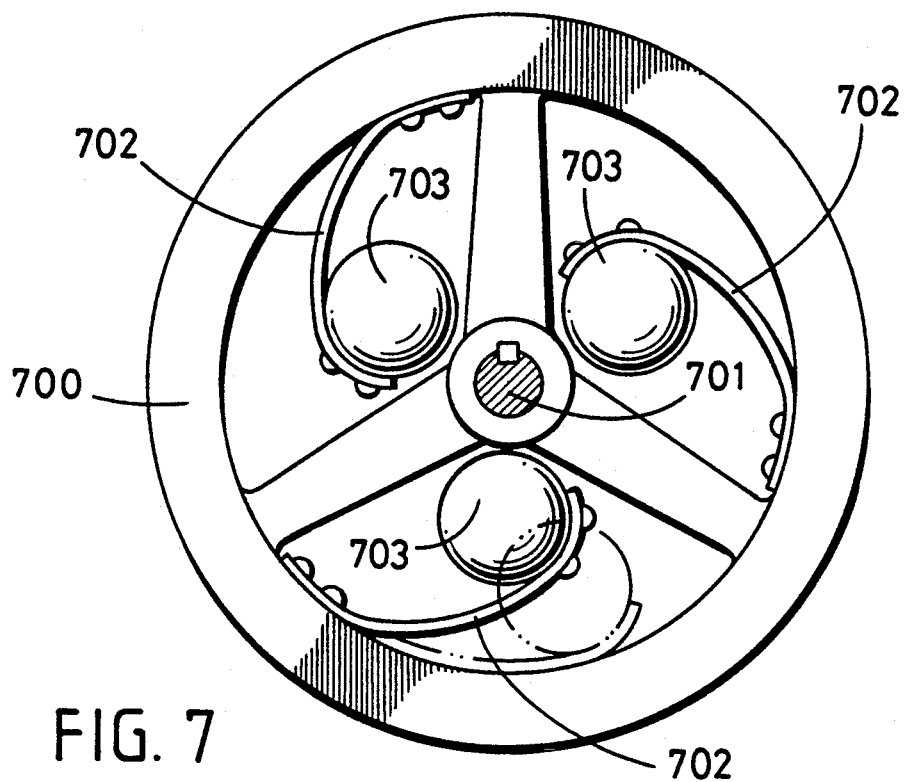
FIG. 7 is an embodiment of centrifugal linear following structure comprising inertia block with radially stretching elastic spring arm.
Figure 8:
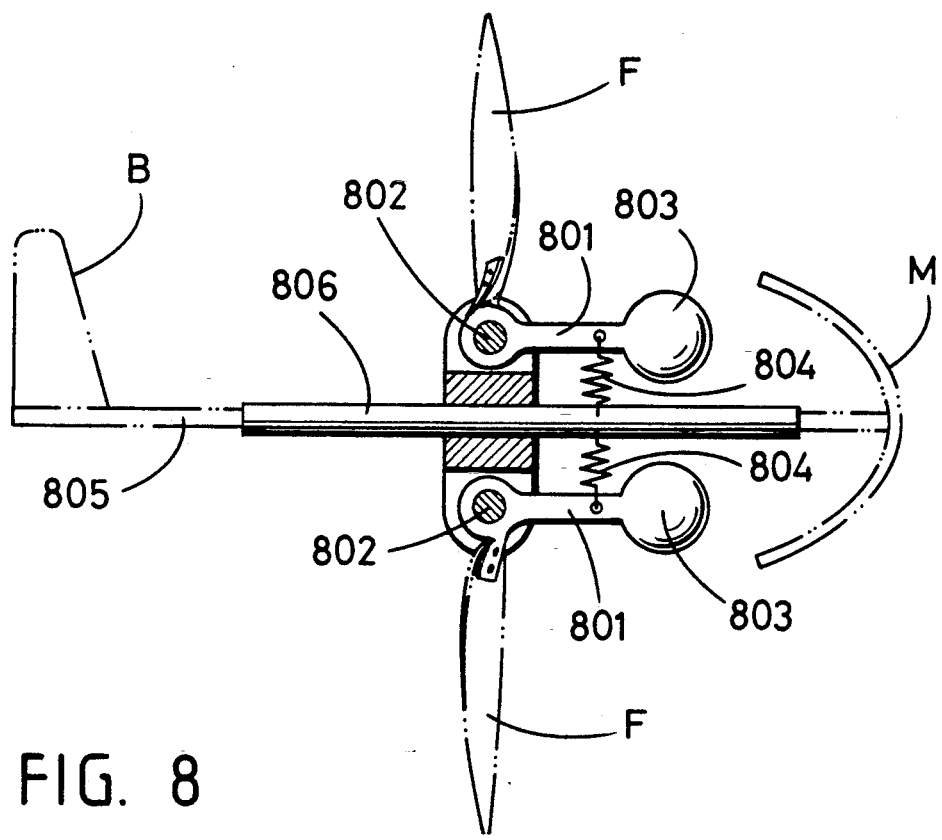
FIG. 8 is an embodiment of inertia block with radially stretching and intermediate supporting arm and spring extensive motion type tension arm.

FIG. 7 is an embodiment of centrifugal linear following structure comprising inertia block with radially stretching elastic spring arm comprising:

flywheel 700: for energy storage and release rotary driving and provided to mount inertia block and positioning spring etc. thereon;

flywheel axial 701: gyration center for flywheel;

at least two sets of positioning sheet type spring 702 for inertia block: one end secured near outer rim of flywheel and the other end stretching inward, and its inward stretching end provided for coupling inertia block;

at least two sets of inertia blocks 703: for mounting inertia block positioning spring outward stretching end, when rotational speed of flywheel is faster, centrifugal force is increased to overcome spring force for radially displacement and when the rotational speed of flywheel is decreased gradually, it tends to return to the center to make flywheel inertia mass accompanying speed variation;

FIG. 8 is an embodiment of inertia block with radially stretching and intermediate supporting arm and spring extensive motion type tension arm comprising:

inertia block set permitted for radial displacement: for energy storage and release rotary driving radially and radiant-type uniform externally radial arm 801, and external end at one side of its radial arm has inertia block 803 with greater weight, and same side has tension spring 804 (or another side with spring appearing thrust with axial) appearing tension against axial to make spring at tension state when inertia block 803 extending outward during speed up, and another side of radial arm contracts inward; when speed down the resilience of spring would enable radial arm and inertia block to return and release energy.

The device has a body 806 which is rotatably connected to a shaft 805 line portion as shown in FIG. 8 is the embodiment of energy storage of matched fluid-pressure driving wing piece and related structure of driving device wherein radial arm 801 swings along swinging (pivotal) axial 802 and the radial arm with inertia block 803 has tension spring 804, tail end of axis 805 has oriented tail wing B, and frontal end has commutator hood M facing air stream, and fluid tail wing (fin F) mounted at radial arm 801, once facing air fluid it would be engaged in relative operation to employ the axis 805 as the center; when speed is increased, inertia block extending outward due to centrifugal force to enable radial arm to lean backward whereby gyration inertia mass of the whole device is increased; when fluid speed down and rotational speed is reduced, inertia block contracts inward gradually to release energy and accomplish speed regulation at rather stable condition.

Figure 9:
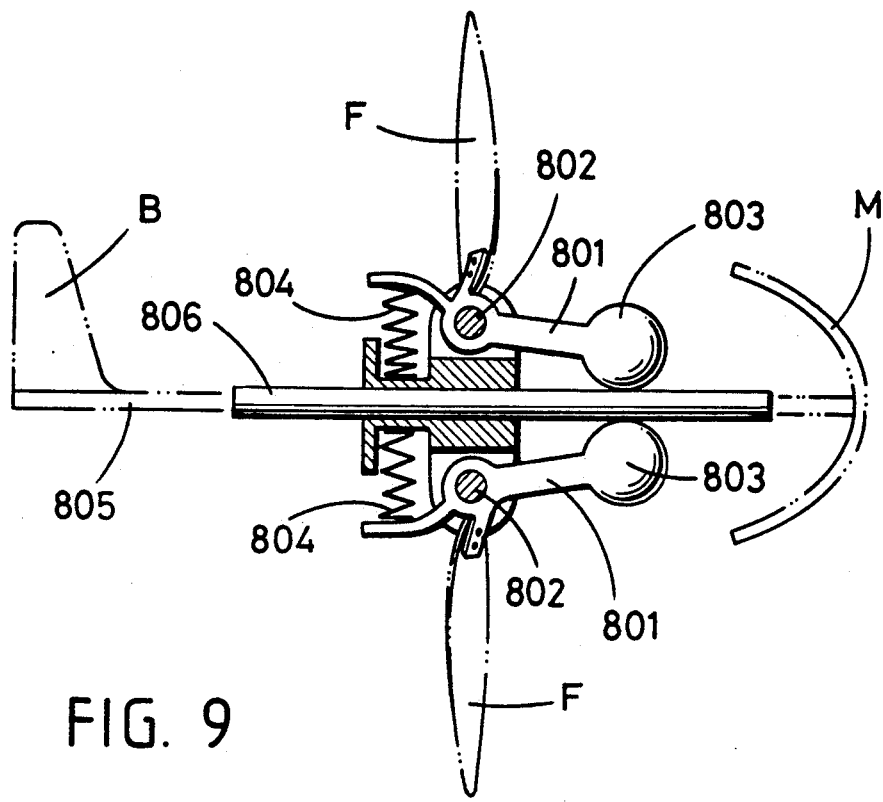
FIG. 9 is an embodiment of inertia block with radially stretching and intermediate supporting arm and spring compressive motion type tension arm.

FIG. 9 is an embodiment of inertia block with radially stretching and intermediate supporting arm and spring compressive motion type tension arm.

The spring of the embodiments as shown in FIGS. 8 and 9 also can be in substitute by compressive fluid cylinder, piston and link, and besides the principle and structure of actively driving or centrifugal linear following dynamic flywheel effect can combine with other machines to construct jointly centrifugal linear following adjustment effect.

Figure 10:
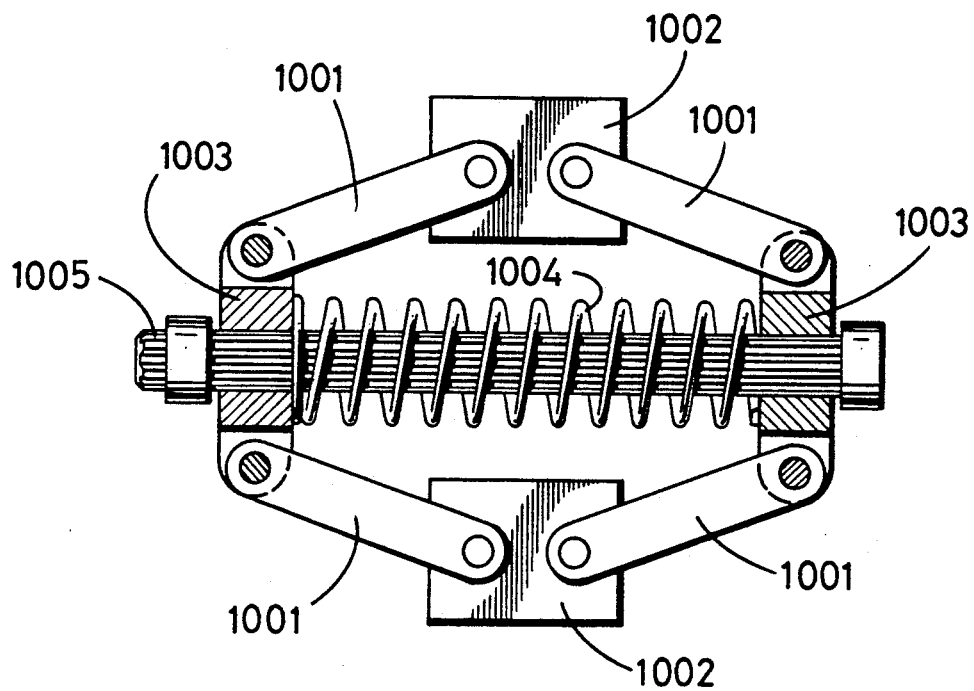
FIG. 10 is an embodiment of crank link type centrifugal device comprising compressive spring.

FIG. 10 is an embodiment of crank link type centrifugal device comprising compressive spring, comprising at least two sets of crank links 1001 jointly connected to sliding block and inertia block 1002 mounted at crank abrupted joint, compressive spring 1004 can be mounted between two sliding rings 1003 to enable inertia block 1002 to lean closely against turning axis 1005 due to tension propping open two sliding rings when sliding rings 1003 keep still at turning axis, and due to centrifugal force inertia block displaces outward and further forces two sliding blocks clamp inward said spring to obtain energy storage function; when speed down the tension of spring enables inertia blocks contract inward and further speed up energy release.

To conclude above-said description, the principle and structure of actively driving or centrifugal linear following dynamic flywheel effect according to the present invention relates to provide a principle and structure of actively driving or centrifugal linear following dynamic flywheel effect to make fixed relationship between said energy storage, energy release and speed controllable and adjustable; when flywheel is used speed rate change can be minimized due to moment change, and due to dynamic energy is direct proportion to the square number of inertia mass times speed, so that we can change the characteristics of inertia mass absorption or release through the variation of inertia body radius R. It is new and applicable to energy storage steady pulse, etc. to provide industrial value. Please examine it in accordance with the law.

I claim:

1. A device for storage and release of energy using centrifugal force, the device comprising:
   a body rotatably connected to a center shaft,
   a hood connected to the center shaft and extending forwardly of the body,
   a directional tail fin connected to the center shaft and extending rearwardly of the body,
   a pair of fins pivotably connected to the body, the fins being mounted diametrically opposed to one another and extending outwardly from the body, each fin being connected to an arm at approximately a right angle thereto, each arm having an end oriented toward the hood,
   two inertia blocks, one connected to the end of each arm,
   two springs, each spring connecting a respective arm to the body,
   wherein, an air stream directed toward the device is deflected by the hood toward the fins, the directional tail fin maintaining the body facing toward the air stream,
   the air stream engaging both fins and forcing the fins to pivot rearwardly toward the directional tail fin and thereby rotating the body about the center shaft,
   the inertia blocks being displaced radially by centrifugal force from an at rest position adjacent to the body,
   the springs thereby being extended and storing energy therein,
   and wherein, when the air stream force decreases, the springs urging the inertia blocks to return toward the at rest position, thereby releasing the stored energy and sustaining the rotation of the body.

2. The device of claim 1, wherein the springs are connected to respective arms near the inertia block.

3. The device of claim 1, wherein the respective arms each have a second end, the second ends extending rearwardly toward the directional tail fin, the springs being connected near the second end of each arm.

* * * * *